J. BECKER.
FOCUS AND FIELD FINDER.
APPLICATION FILED FEB. 17, 1905.

1,210,136.

Patented Dec. 26, 1916.
3 SHEETS—SHEET 1.

Witnesses

Inventor
Joseph Becker

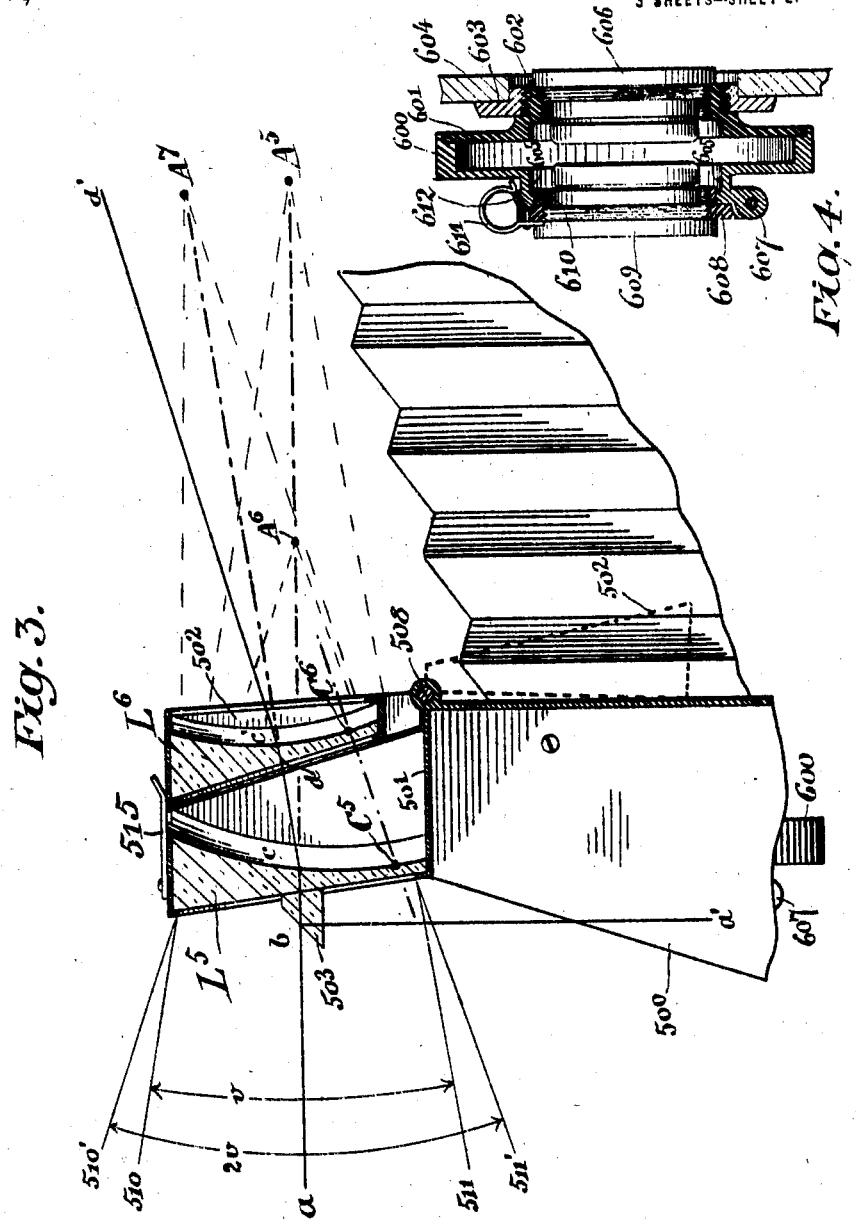

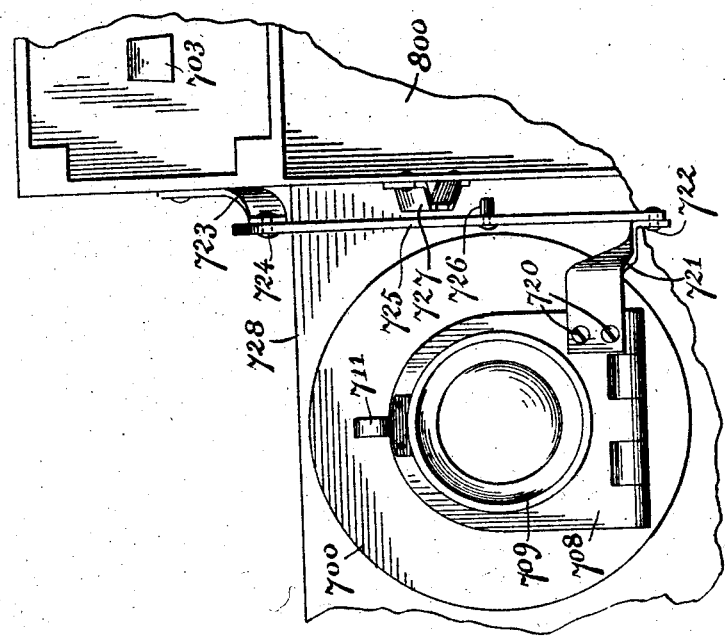
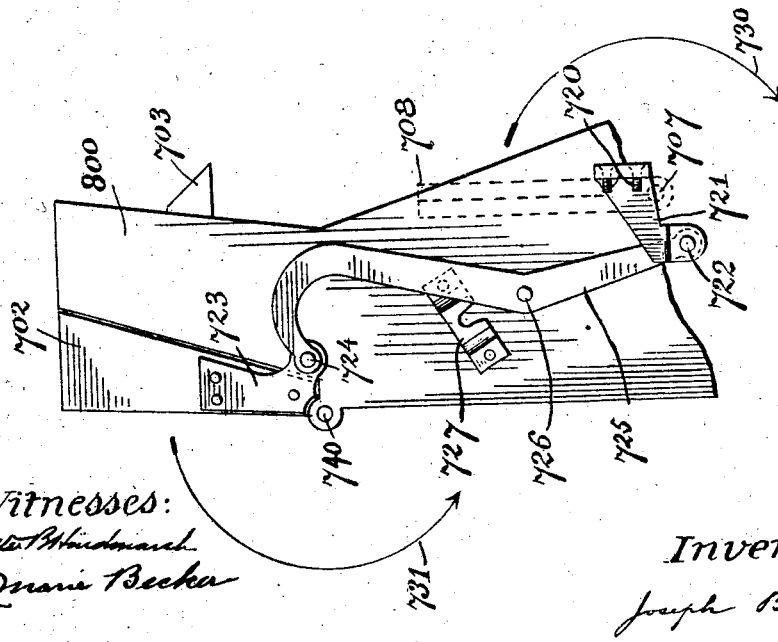

UNITED STATES PATENT OFFICE.

JOSEPH BECKER, OF WASHINGTON, DISTRICT OF COLUMBIA.

FOCUS AND FIELD FINDER.

1,210,136.

Specification of Letters Patent.

Patented Dec. 26, 1916.

Application filed February 17, 1905. Serial No. 246,169.

*To all whom it may concern:*

Be it known that I, JOSEPH BECKER, a citizen of the United States, residing at Washington, in the District of Columbia, have invented certain new and useful Improvements in Focus and Field Finders, of which the following is a specification.

The present patent application is identified for convenience of reference in my related applications or patents as Case J.

The present invention consists in an improved form of the camera disclosed in Figure 11 of my prior patent application, Case C, now Patent 1,178,476, issued April 4, 1916, and it involves most of the features disclosed, first in my French Patent No. 308,848, filed March 9, 1901, and secondly, in my "Addition Patent" No. 2,933, filed February 20, 1904, as a first addition to such French patent.

Figure 1:
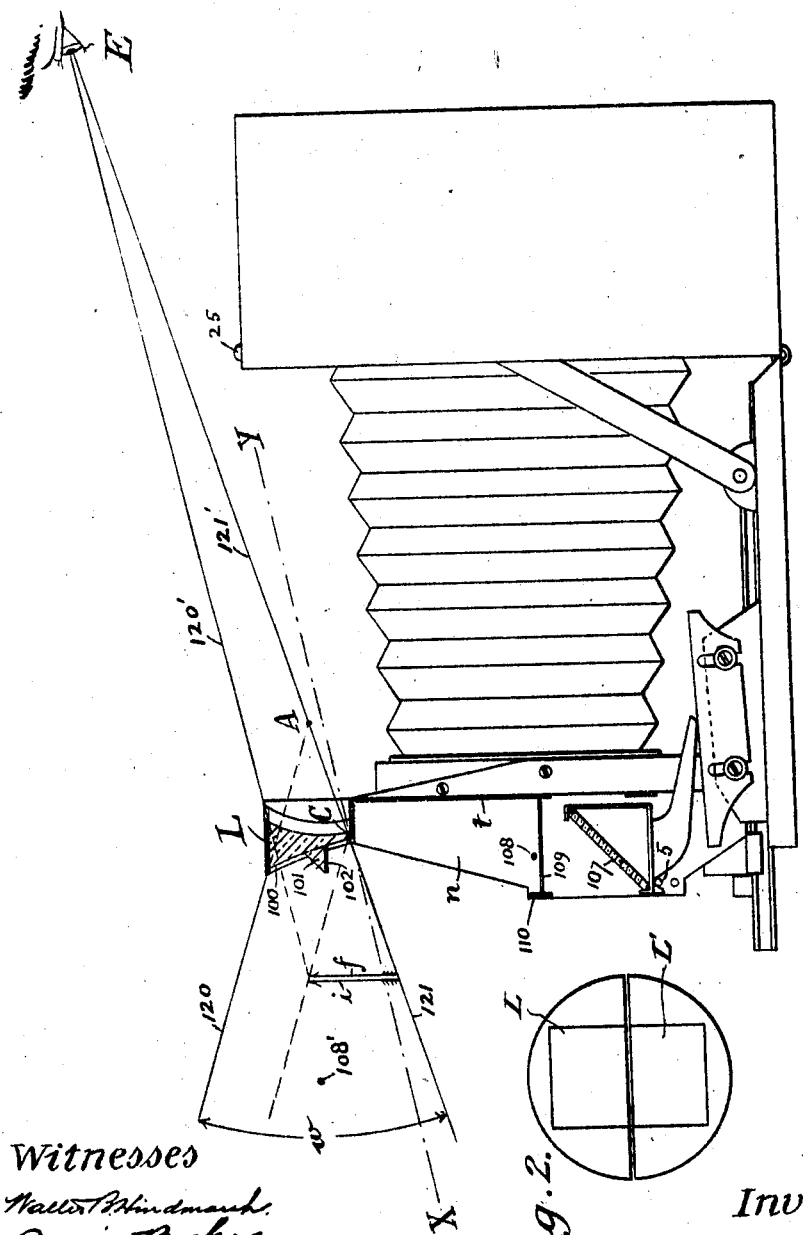
Figure 2:
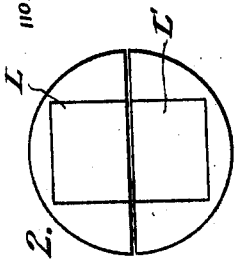

In the accompanying drawings, which form part of this specification: Fig. 1 is a side view of a folding camera of the usual construction, in combination with my simplified form of field and focus finder, the latter being shown with its nearer half broken away; Fig. 2 is a diagram illustrating the construction of half lenses; Fig. 3 is a vertical section of a compound form of focus and field finder; Fig. 4 is a vertical section of a compound form of camera objective used in conjunction with the focus and field finder of Fig. 3; Fig. 5 is a side view of an improved form of the compound field and focus finder of Fig. 3, showing the same mechanically connected with the camera objective of Fig. 4; Fig. 6 is a front elevation of the same.

*Improvements to secure a more perfect image.*—These improvements relate mainly to the eccentric lens and consist principally in so building and setting it in its mount or on the camera that its principal axis, instead of being parallel with the principal axis of the camera objective, as in my said prior Case C, shall lie in an inclined position thereto, so as to pass close by or even into the operator's eye. When the finder lens is composed of but a single lens this condition is satisfied by properly inclining the lens, to tilt its thicker edge forward, that is, in a direction away from the camera plate or film or away from the operator and toward the object.

In Fig. 1 of the accompanying drawings I show my improved form of single-lens-focus-and-field-finder, the general arrangement of which is the same as in my said prior Case C. L is the simple finder lens, which has its outer face 100 slightly concaved to avoid excessive curving of the rear face. This lens is tilted as indicated by the inclination of its principal axis XCY. The inclination shown is that in which the image formed by the lens is the most nearly perfect. That is, if the lens were tilted either farther or less than shown deformations would be introduced in the finder image, due to variations in refraction. In the best position the rays of light that pass through the thicker parts of the lens in their course through the lens meet the lens faces at equal angles, and suffer the least refraction. A slight tilting either way from the best position does not appreciably distort the image and, therefore, a certain latitude is allowable in mounting the lens.

The best inclination of a given eccentric lens is very easily found by direct experiment in the following manner: Observe through it almost any object, holding the lens on a level with the center of the object and with its deeper concave face toward the observer. The point of view should be enough higher than the lens to center the image of the object in the lens. Then tilt the lens back and forth, noting that the vertical dimension of the image varies, and that in tilting from one extreme position to the opposite extreme position the said vertical dimension of the image will first increase to a certain maximum and then decrease. It is in an intermediate position where the image is tallest that the image has the least distortion and that the lens is at the proper inclination. As a rule lenses that are plano-concave, or nearly so, will be properly enough inclined when the general direction of the concave or eye face of the lens is vertical, that is, when the lens is mounted in the camera with the general direction of its deeper concave face parallel with the camera plate.

My invention involves certain geometrical relations which are peculiar to it and which I shall now set forth.

The extreme finder rays 120 and 121 produced beyond the lens L intersect in a point A at an angle $w$ which is equal to the corresponding angular value of the camera field. The refracted parts 120' and 121' of these same extreme rays proceed to meet in the operator's eye at E. Points E and A are, therefore, conjugate foci of the lens and must be substantially in alinement with C which represents the two, in this case, practically merged nodal points of the lens. Moreover, as by the present invention the principal axis XCY of the lens passes close by or even in the eye E the focal length $f$ of the lens can be derived directly from the standard lens formula:

$$\frac{1}{f} = \frac{1}{CA} - \frac{1}{CE}$$

It should be noted that A is not a purely imaginary point, for any person being photographed sees in A a reduced image of the operator's eye E, and the extent of field seen by the eye E through lens L is exactly the same as would be seen if the lens L were resumed and the eye E were shifted to A. I, therefore, call A the "virtual eye" or the "virtual position" of the operator's eye.

*Concavo-convex prism.*—Onto the face 100 of the lens L is cemented the prism 101 which has its cemented face made convex to fit face 100. The under face 102 of the prism is also curved, being made concave to the same radius as the face 100 of the lens. This is in order that the reflected rays shall traverse two curved surfaces similar to those traversed by the direct rays, and shall, therefore, produce a reflected image $i$ of the same size as the directly formed image $f$. The reflected rays also traverse the cemented curved surfaces, but they pass through them without being refracted as if the prism and lens were made of one piece of glass.

The lens L being inclined to secure the best image, the prism must be ground so that its reflecting face shall be properly inclined. The certain latitude allowed in the angular set of the lens allows of a corresponding latitude in the accuracy with which the prism is to be ground. The forward tilt of the lens holds the prism clear of the lower edge of the lens and, therefore, the prism need not have its upper edge ground down as indicated at 40, Fig. 10 of my said Case C. The side faces of the prism, to be invisible to the observer and leave a sharp cut separation between the apparent parts of the two images $f$ and $i$, should be directed to the virtual point A, which as above stated is the virtual position of the observer's eye. Face 102 might also be exactly directed on A with the same object. In the figure the general direction of face 102 passes a little below A.

*Improvements in the sights.*—The pivoted mirror shown in this form is a plain piece of mirror glass 107, mounted to rotate on pin 5. To determine the line of sight I use crossed wires 108, 109 fastened to the walls $n$, $t$ and to cross stay 110 of the frame. As wire 109 merely serves to determine the line of sight in the horizontal direction, it may be dispensed with because the same purpose is accomplished by sight 25 on the camera in combination with the mirror 101. The wire 108 or rather its image 108′ then determines as before the elevation of the observer's eye, whose position in azimuth is fixed by bead 25. The lens shown in the figure is a half lens because I preferably use half lenses, as they are easily made by simply splitting full lenses diametrically, that is to say on a meridian plane as in Fig. 2. The half lens is, in fact, a very practical and useful form of my eccentric lens.

The last proposed form of sight reduced to wire 108 and bead 25, and in which the line of sight is determined by the intersection of two perpendicular planes, is not limited to the one lens form of finder, but is generally applicable to any one of my eccentric finders, simple or compound, and is also independent of the pivoted mirror, as the latter might be removed without affecting the operation of the sighting means, in which the fixed mirror 101 considered as an element of the sighting means simply serves to form the virtual horizontal image 108′ of wire 108. The corresponding vertical image of wire 109 is purposely omitted in Fig. 1 because the wire 109 itself can be and preferably is dispensed with as explained above.

*Compound eccentric lenses.*—The principles of construction given above for single finder lenses apply to compound finder lenses, but not so strictly because a two lens finder, for instance, as compared with a single lens finder of the same focus, has shallower curves and as a rule produces much less distortion in the image. Considerable latitude, therefore, is allowable in the designing and mounting of the elements of a compound finder lens or of the compound finder as a whole. However, the principles given above to reduce distortion in single lens finders can be applied with advantage to reduce aberrations in the compound lens finders; especially is this so when the front element of the compound finder is to be used singly for long focus work, as in Fig. 11 of my said Case C. In this case the principle is first applied to the front lens used singly, as explained in connection with Fig. 1, and then it is also taken into account in adding the other lens to form the type shown in Fig. 3, which also contains other novel features. The parts that are omitted in Fig. 3 are substantially the same as seen in Fig. 1, except that the bed of the camera is extended to support a second cam for long focus work as set forth in Fig. 11 of my said prior Case C.

The finder frame 500 has a cross piece 501 which forms a box-like frame in which the front lens $L^5$ is firmly fixed by means of cement or clamps. The upper rear part 502 of the frame 500 is hinged to the frame proper at 508 so that it may be turned down into the dotted position. This hinged part has firmly fixed therein the rear lens $L^6$.

The front lens $L^5$ is inclined according to the principles of Fig. 1. Supposing the rear lens to be in its turned down or dotted position, the extreme finder rays 510, 511, limiting a field represented by angle $v$, when produced without refraction, meet in $A^5$, which is the virtual position of the operator's eye for long focus work.

For short focus work the extreme finder rays limit a field $2v$ which may have any value required by the camera, but is supposed to have just twice the value of $v$, because this is the usual proportion between the short and long focus fields of the camera. These extreme rays 510′, 511′, produced without refraction, meet in $A^6$, which is the virtual position of the observer's eye for short focus work. But the rays 510′, 511′, in passing through the first lens $L^5$, are refracted and really proceed toward a point $A^7$ situated on the secondary axis $C^5 A^6$ of the front lens $L^5$. The point $A^7$ is the virtual position of the operator's eye for the rear lens and is used according to the rules given above to find the optical center $C^6$ and the focal length of lens $L^6$ just as $A^5$ was used to find the eccentricity and focus of the front lens $L^5$. The point $C^6$ so determined generally falls very close to or even on axis $C^5 A^6$ of the front lens $L^5$ so that the axis $C^5 C^6$ of the compound lens produced passes in or close by the operator's eye.

The inclination of the front lens $L^5$ being determined as just explained, the prism 503 cemented thereon should preferably have its cemented face ground so its reflecting face shall be inclined to properly reflect the central ray $a' b c c' d'$ coming along $a' b$ from the pivoted mirror corresponding to mirror 107 of Fig. 1; for, when this is not done, the lower mirror must be made larger, that is, rather longer, as seen in Fig. 1, to make sure that it will fill the prismatic mirror. It should be noted, however, that the front lens $L^5$, being usually a long focus lens, can be set less inclined than shown in Fig. 3, or even more inclined, without materially affecting the finder image. As a rule, therefore, I prefer to use a common 45 degree prism for prism 503, and to set the front lens so it will hold the reflecting face of the prism in the best position with respect to the pivoted mirror, as set forth in my said Case C, and to apply the corrections for distortion solely to the rear lens. In this way I am enabled to show the greatest possible extent of the second image consistent with compactness, by using the largest possible prism, and the prism used is of a standard type. Thus are secured at the same time efficiency, compactness and facility of manufacture.

The rear lens $L^6$ can be very loosely mounted, even to the extent of having a certain play on its hinge 508, without affecting the apparent relative position of the two images, as this relative position is solely dependent on the mirrors. But when the front lens $L^5$ carries the eye mirror as here shown it should be firmly connected with the frame and may be conveniently fixed thereto by means of plaster of Paris.

The separable form of eccentric lens finder may be used without the mirrors purely as a field finder and is also useful even in combination with cameras that have not a separable compound objective. In such cameras it still presents the advantages of forming a very perfect finder image and of having its inner lens faces easily accessible for cleaning.

*Improved objective mount.*—I have discovered that the hinged construction of my finder frame is equally applicable to the camera objective which is used in combination with my compound finder, and that such mounting may be made in a manner that will firmly hold the movable element of the camera objective when in use in the exact mathematical relation required; that is, truly centered and at the proper distance from the coöperating element. This construction is shown in Fig. 4, where 600 is the main housing for the diaphragm shutter. This housing has a cover 601 with threaded flange 602. The outside thread of this flange serves to hold the lens in the ring 603, which is fixed in any suitable manner to the front board 604 of the camera. The inside thread of the same flange holds the rear fixed element 606 of the objective. The construction so far described is the usual construction and may be varied at will. The front part of the casing 600 has a flange 605 on which is hinged at 607 a gate 608 in which the front movable element 609 of the objective is firmly mounted by screw connection in the usual manner. This gate has a conical flange 610 which fits snugly in a conical aperture of flange 605 so as to truly center the lens and in order to insure that the lens 609 shall be held parallel with lens 606 and at the proper distance therefrom the cone is so made as to allow the gate to bear with its inner face flat against the front face of flange 605. To hold the gate firmly closed I use a strong spring catch 611, which engages with a projection 612 formed on the flange 605 and which also serves as a handle to be used in opening and closing the gate. This objective mount is useful in any camera in which an element of the objective is intended to be removed during use; and it presents the advantages that no time is lost in screwing and unscrewing the movable element, that there is no danger of injuring the screw threads by repeated and hasty screwing and unscrewing of the removable element; that the removable element is always surely brought back to its exact position of use which is not the case with the screw thread unless considerable care is used; that the movable element remains connected to the mount and is permanently held against injury; that the operation of moving the movable element from its position of use to its position of non-use, and vice versa, is rapid and requires no skill. The photographer is thereby enabled to quickly and easily change from long focus work to short focus work; an inestimable advantage in instantaneous photography.

*Mechanically connected compound finder and compound objective.*—When the objective and the finder are both compound, as in Figs. 3 and 4, the operator might easily by mistake use the compound finder with the single element of the objective or the compound objective with only one element of the finder. To render such errors impossible and at the same time to reduce the number of operations required to pass from short focus work to long focus work, I mechanically connect the finder with the objective so that opening or closing the one necessarily opens or closes the other. Such a combination is illustrated in Figs. 5 and 6, where the finder and the objective are in every respect the same as shown in Figs. 3 and 4 and need not be described further than to state that the correspondence of parts in the two is indicated by similarity of reference signs. The gate 708 of the camera objective has fastened thereto by means of screws 720 a crank arm 721, which carries a wrist pin 722 situated preferably as shown in Fig. 5 so the direction of the radius 722—707 shall be about perpendicular to the line drawn from the objective pivot 707 to the finder pivot 740. The finder gate 702 carries a similar arm 723 with pin 724 so situated that the distance 724 to 722 shall be exactly equal to the distance 707 to 703. A link 725 is provided to connect the two arms so that when the objective gate 708 is lowered, by turning it clockwise as indicated by arrow 730, Fig. 5, the finder gate 702 will follow and also turn down counterclockwise as indicated by arrow 731. In this turning operation, when the gates have opened about half way, the link and crank arms are on a dead center, which is avoided by providing the link 725 with a pin 726 adapted to engage in a bearing 727, which is fastened to frame 800. The pins 724, 722 and 726 are in a straight line and the distance between pins 724 and 726 is equal to one-half the length of the link plus one-half the length of the crank arm.

The link 725 is curved, as seen in Fig. 5, in order that it shall be able to pass over and behind the frame 728, which supports the camera objective and the finder.

Opening either gate opens the other and closing either closes the other; I prefer, however, to open and close the objective gate 708. As the locking spring catch 711 of this gate suffices to lock both gates, the spring catch 515 of Fig. 3 is dispensed with.

The mechanically connected compound finder and objective may be used without the mirrors, purely as a field finder, without losing any of its advantages except such as may depend upon focusing.

Exact half lenses might be used in Fig. 3 and can generally be used in such form by choosing the foci of the length necessary to insure that the relation between the two finder fields shall be the same as the relation between the two camera fields.

What I claim as my invention and desire to secure by Letters Patent is:

1. As an optical element of focus and field finding means the combination consisting of an eccentric lens having its outer face concave and a prism cemented on such face, said prism having its dioptric cemented face ground to the same curvature as the outer face of the said lens to fit the same and its other dioptric face ground concave to the same curvature.

2. The combination with a camera and an eccentric divergent lens finder, of a sight on the camera to determine one plane of the sighting line, and sights in fixed relation to the finder to determine an intersecting plane.

3. The combination with a camera and its objective having an optical element thereof hinged thereon to permit of turning said element from its position of use into a position of non-use in order to change the focal length of the camera objective and the extent of the camera field, of a finder having an optical element thereof hinged thereon to permit of turning said element from its position of use to a position of non-use in order to produce a similar change in the extent of the finder field.

4. The combination with a camera and its objective having an optical element thereof hinged thereon to permit of turning said element from its position of use into a position of non-use in order to change the focal length of the camera objective, of a finder having an optical element thereof hinged thereon to permit of turning said element from its position of use to a position of non-use in order to change the extent of the finder field, and a link connecting the said hinged finder element with the said hinged objective element to cause the two movable elements to move simultaneously.

5. The combination with a camera objective having an optical element thereof adapted to be moved for the purpose of changing the focal length of the objective, and a finder having an optical element thereof adapted to be moved for the purpose of changing the extent of the finder field, of mechanical connections to cause the said movable elements to move simultaneously.

6. The combination with a photographic camera of an optical focuser therefor comprising two mirrors and a lens coöperating with said mirrors to form two relatively movable images of an object point in the camera field; said lens having its first or ray admitting face curved and adapted to serve as a transparent support for one of the said two mirrors; said supported mirror being formed of a total reflection prism having its reflecting or hypotenuse face flat and its other two substantially perpendicular or refractive faces curved to the same radius as the first or admission face of the said supporting lens, but one convex and the other concave, whereby the curved face of the prism that fits the first or admission face of the supporting lens may be used as a cementing face, whereas the other curved face of the prism remains as a lenticular refracting face in place of the covered and cemented surface element of the supporting lens whose refractive properties have been annulled by cementing.

7. The combination with a camera having an objective composed of a plurality of optical elements and mechanism connecting said optical objective elements, whereby one of the said optical objective elements is rendered movable, and positively guided, from its position of use, into a position of non-use on the camera, to permit of changing the focal length of said objective and, incidentally, the extent of the camera field; of a finder connected with said camera and composed of a plurality of optical finder elements, and mechanism connecting the said optical finder elements, whereby one of said optical finder elements is rendered movable, and positively guided from its position of use into a position of non-use on the camera, to permit of producing changes in the finder field corresponding to those produced in the camera field; all of said movable and other optical elements being so proportioned that said camera and finder fields shall be substantially identical, not only when both of said movable optical elements are in their positions of use, but also when both of said movable optical elements are in their positions of non-use.

In testimony whereof I have signed this specification in the presence of two subscribing witnesses.

JOSEPH BECKER.

Witnesses:
 WALTER B. HINDMARSH,
 MARIE BECKER.